(No Model.)
W. W. CARLISLE.
LAWN RAKE.
No. 507,484. Patented Oct. 24, 1893.
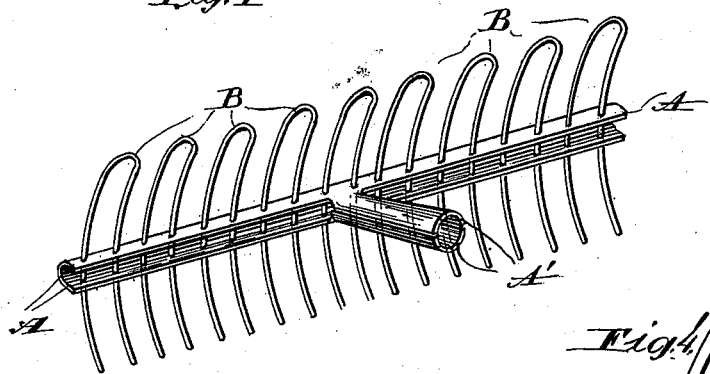
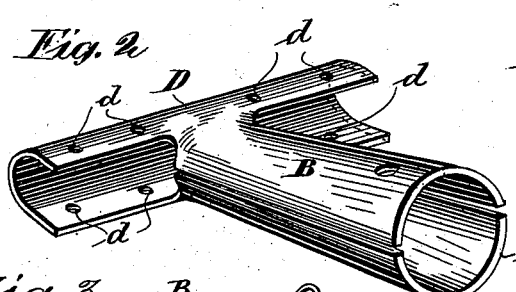
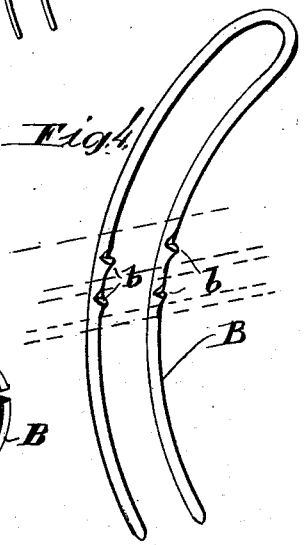
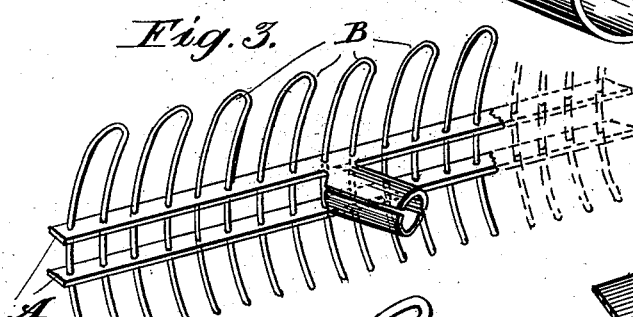
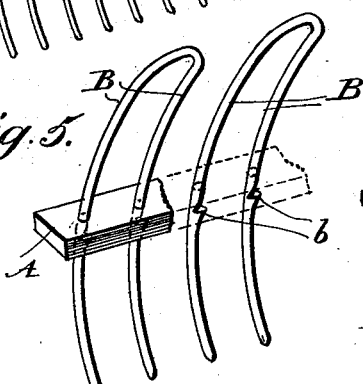
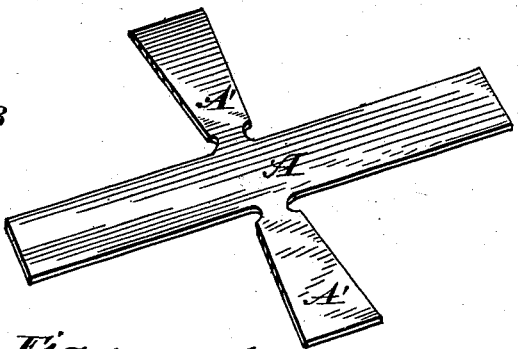
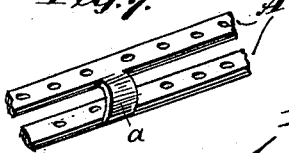
Witnesses
Adolph Gorge
E. C. Green
Inventor
Wm. W. Carlisle.
by Wm. M. Monroe,
Attorney

UNITED STATES PATENT OFFICE.

WILLIAM W. CARLISLE, OF CLEVELAND, OHIO.

LAWN-RAKE.

SPECIFICATION forming part of Letters Patent No. 507,484, dated October 24, 1893.

Application filed April 6, 1893. Serial No. 469,249. (No model.)

*To all whom it may concern:*

Be it known that I, WILLIAM W. CARLISLE, a citizen of the United States, and a resident of Cleveland, county of Cuyahoga, State of Ohio, have invented certain new and useful Improvements in Lawn-Rakes, of which I hereby declare the following to be a full, clear, and exact description, such as will enable others skilled in the art to which it appertains to make and use the same.

My invention relates to improvements in lawn rakes, and its object is to provide a simple, strong and efficient form of rake bar of light construction provided with light and elastic teeth.

My invention further consists in the construction and arrangement of parts as hereinafter described, shown in the accompanying drawings and more specifically pointed out in the claims.

In the drawings, Figure 1 is a perspective view of a rake formed on my improved design. Fig. 2 is a detail of detachable handle. Fig. 3 is a modified form. Fig. 4 is a view of one of the teeth. Fig. 5 is a modified adaptation of the teeth. Fig. 6 is a view of the metal plate employed to form the rake bar, and handle socket. Fig. 7 is a detail.

In the figures A is the rake-bar, into which the teeth B are inserted.

A' is the handle socket formed by extensions from the material of the bar.

C is a detachable form of handle socket adapted to be used with either of the forms shown in Figs. 1 and 3.

B, Fig. 4, is a detached tooth provided with notches *b* so located as to overlap the edges of the drill holes, *a*, when the tooth has been inserted, the spring of the metal in the tooth preventing its being withdrawn.

In Fig. 3 a somewhat modified form is shown, the back of the metal sheet being cut out so as to leave merely the two strips through which the teeth are inserted.

For a still simpler form of rake a simple block of wood could be employed underneath which the notched teeth *b* project.

There are several ways in which the form of rake shown in Fig. 3 could be made, as for instance the bars can be connected in the middle in the rear by a strip *a* of the same material, and the metal can be projected in front to form handles as shown in Fig. 3, or the strips forming the supports for the teeth may be entirely detachable and a block inserted for the handle, or a similar socket to that shown in Fig. 2 inserted. A variety is shown in Fig. 7.

Having described my invention, what I claim as new, and desire to secure by Letters Patent, is—

1. In a lawn rake a tooth bar consisting of a sheet metal plate A, bent to form parallel supports for wire teeth, and provided with perforations for the teeth, in combination with teeth provided with notches, substantially as described.

2. In a lawn rake the combination of a sheet metal tooth bar so bent as to form parallel supports at intervals for notched wire teeth, and an integral handle socket, as and for the purpose set forth.

WM. W. CARLISLE.

Witnesses:
WM. M. MONROE,
ADOLPH GORGE.